United States Patent [19]
Helmsderfer

[11] Patent Number: 5,934,316
[45] Date of Patent: Aug. 10, 1999

[54] COVER ASSEMBLY AND METHOD FOR COVERING UNDERSINK PIPING

[76] Inventor: John A. Helmsderfer, 1033 Windsor Ct., Cincinnati, Ohio 45206

[21] Appl. No.: 08/940,063

[22] Filed: Sep. 29, 1997

Related U.S. Application Data

[60] Division of application No. 08/490,599, Jun. 6, 1995, Pat. No. 5,685,328, which is a continuation-in-part of application No. 08/337,971, Nov. 14, 1994, Pat. No. 5,564,463, which is a continuation-in-part of application No. 08/271,439, Jul. 7, 1994, Pat. No. 5,586,568, which is a continuation-in-part of application No. 08/146,999, Oct. 29, 1993, Pat. No. 5,341,830.

[51] Int. Cl.$^6$ ...................................................... F16L 59/16
[52] U.S. Cl. .............................. 137/375; 137/269; 16/118
[58] Field of Search .............................. 137/15, 375, 797, 137/269; 16/117, 118

[56] References Cited

U.S. PATENT DOCUMENTS

| | | | |
|---|---|---|---|
| 313,958 | 3/1885 | Seymour | 138/158 |
| 411,115 | 8/1889 | Wendell | 138/159 |
| 438,507 | 10/1890 | Tracey | 285/47 |
| 1,771,134 | 7/1930 | Morgan | 285/47 |
| 1,814,134 | 7/1931 | Eige | 138/40 |
| 2,078,606 | 4/1937 | Le Grand . | |
| 2,140,308 | 12/1938 | Belshaw | 285/47 X |
| 2,449,265 | 9/1948 | Williams . | |
| 2,650,180 | 8/1953 | Walker | 137/375 |
| 2,761,949 | 9/1956 | Colton | 285/47 X |
| 2,841,203 | 7/1958 | Gronemeyer | 138/160 X |
| 2,937,662 | 5/1960 | Green | 285/47 |
| 2,964,064 | 12/1960 | Jones | 285/47 |
| 3,014,827 | 12/1961 | Clinchy et al. | 138/161 |
| 3,102,740 | 9/1963 | Plummer | 285/47 |
| 3,153,546 | 10/1964 | Dunn | 285/47 |
| 3,172,377 | 3/1965 | Dewar | 137/797 X |
| 3,402,731 | 9/1968 | Martin | 137/375 |
| 3,425,456 | 2/1969 | Schibig | 137/375 |
| 3,556,158 | 1/1971 | Schneider | 138/156 |
| 3,559,694 | 2/1971 | Volberg | 285/47 X |
| 3,598,157 | 8/1971 | Farr | 138/157 |
| 3,650,299 | 3/1972 | Seiler et al. | 138/149 |
| 3,790,418 | 2/1974 | Huvey et al. | 137/375 X |
| 3,801,140 | 4/1974 | Keller | 285/47 |
| 3,804,438 | 4/1974 | Humphries et al. | 285/47 |
| 3,960,181 | 6/1976 | Baur et al. | 138/178 |
| 4,046,406 | 9/1977 | Press et al. | 285/47 |

(List continued on next page.)

FOREIGN PATENT DOCUMENTS

| | | |
|---|---|---|
| 1249974 | 2/1989 | Canada . |
| 2714576 | 10/1978 | Germany . |
| 4201 | 4/1899 | United Kingdom ................... 138/158 |

*Primary Examiner*—John Rivell
*Attorney, Agent, or Firm*—Wood, Herron & Evans, L.L.P.

[57] ABSTRACT

An insulative cover for undersink angle stop valve assembly comprises a first elongated piece having a pipe portion configured to cover a supply pipe and a valve portion configured to cover an angle stop valve. The valve portion has an oblong opening with opposite ends to facilitate connection of the supply line to the angle stop valve at either end, such that the valve portion may cover valves having various different lengths. A second piece has a line portion configured to cover the supply line and an oblong cover portion which is configured to cover the oblong opening in the first piece valve portion when the first and second pieces are positioned together. The second piece line portion is coupled to the second piece cover portion approximate one end of the cover portion and may be rotated to fit over the oblong opening such that the line portion is aligned with the point of connection of the line to the valve to provide complete insulation of an angle stop valve assembly. A third cover piece is configured to cover a valve handle and has radially extending projections to cover both a circular handle and a diamond-shaped handle. Alternatively, a closure depends downwardly from the cover portion of the second piece to cover the valve handle. The closure is hingedly attached to the second piece cover portion to be movable away from the handle to allow access to the handle to open and close the valve.

7 Claims, 3 Drawing Sheets

U.S. PATENT DOCUMENTS

| | | | |
|---|---|---|---|
| 4,084,842 | 4/1978 | Stonitsch et al. | 285/47 |
| 4,327,778 | 5/1982 | Williams | 138/149 |
| 4,416,309 | 11/1983 | Salim | 138/104 |
| 4,441,743 | 4/1984 | Steenbergen | 285/45 X |
| 4,463,780 | 8/1984 | Schultz et al. | 138/178 |
| 4,465,307 | 8/1984 | de Lange | 285/47 |
| 4,473,244 | 9/1984 | Hill | 137/375 X |
| 4,484,386 | 11/1984 | Stonitsch | 285/47 X |
| 4,516,278 | 5/1985 | Lamond | 4/679 |
| 4,593,615 | 6/1986 | Cohen | 138/155 X |
| 4,594,740 | 6/1986 | Tseronakis | 137/247.35 X |
| 4,667,505 | 5/1987 | Sharp | 138/161 X |
| 4,669,509 | 6/1987 | Botsolas | 138/178 |
| 4,705,302 | 11/1987 | Beiley | 285/47 |
| 4,746,147 | 5/1988 | Walker | 285/47 X |
| 4,804,210 | 2/1989 | Hancock | 285/47 |
| 4,830,060 | 5/1989 | Botsolas | 138/149 |
| 4,838,318 | 6/1989 | Karakawa | 138/166 |
| 4,840,201 | 6/1989 | Botsolas | 138/178 |
| 4,930,543 | 6/1990 | Zuiches | 138/110 |
| 5,002,716 | 3/1991 | Van Dijck | 285/47 X |
| 5,006,185 | 4/1991 | Anthony et al. | 138/151 X |
| 5,022,685 | 6/1991 | Stiskin et al. | 285/45 |
| 5,025,836 | 6/1991 | Botsolas | 138/110 |
| 5,054,513 | 10/1991 | Trueb et al. | 137/375 |
| 5,055,334 | 10/1991 | Lechuga | 137/375 |
| 5,088,772 | 2/1992 | Van Dijck | 285/47 |
| 5,158,114 | 10/1992 | Botsolas | 138/149 |
| 5,163,469 | 11/1992 | Trueb et al. | 137/325 |
| 5,183,299 | 2/1993 | Halberstrom et al. | 285/47 |
| 5,193,786 | 3/1993 | Guenther | 137/375 |
| 5,259,410 | 11/1993 | Trueb et al. | 137/375 |
| 5,266,740 | 11/1993 | Hsu | 174/72 C |
| 5,303,730 | 4/1994 | Trueb et al. | 137/375 |
| 5,341,830 | 8/1994 | Helmsderfer et al. | 137/15 |
| 5,348,044 | 9/1994 | Eugene et al. | 137/312 |
| 5,360,031 | 11/1994 | Trueb et al. | 137/375 |
| 5,369,818 | 12/1994 | Barnum et al. | 4/624 |
| 5,419,364 | 5/1995 | Trueb et al. | 137/375 |
| 5,454,392 | 10/1995 | Trueb et al. | 137/375 |
| 5,503,193 | 4/1996 | Nygaard | 138/149 |
| 5,522,433 | 6/1996 | Nygaard | 138/149 |
| 5,524,669 | 6/1996 | Trueb et al. | 137/375 |
| 5,540,255 | 7/1996 | Trueb et al. | 137/375 |
| 5,564,463 | 10/1996 | Helmsderfer | 137/375 |
| 5,586,568 | 12/1996 | Helmsderfer | 137/15 |
| 5,649,566 | 7/1997 | Helmsderfer | 137/375 |

COVER ASSEMBLY AND METHOD FOR COVERING UNDERSINK PIPING

"This application is a divisional of application Ser. No. 08/490,599 filed on Jun. 6, 1995, for COVER ASSEMBLY AND METHOD FOR COVERING UNDERSINK PIPING; now U.S. Pat. No. 5,685,328, which application, in turn, is a continuation-in-part of application Ser. No. 08/337,971, entitled COVER ASSEMBLY AND METHOD FOR COVERING UNDERSINK PIPING, filed on Nov. 14, 1994, issued as U.S. Pat. No. 5,564,463, which is a continuation-in-part of application Ser. No. 08/271,439, entitled COVER ASSEMBLY AND METHOD FOR COVERING UNDERSINK PIPING, filed Jul. 7, 1994, issued as U.S. Pat. No. 5,586,568, which is a continuation in part application Ser. No. 08/146,999, entitled COVER ASSEMBLY AND METHOD FOR COVERING UNDERSINK PIPING, filed Oct. 29, 1993, issued as U.S. Pat. No. 5,341,830, and which pending applications and issued patents are completely incorporated herein by reference in their entireties."

CROSS REFERENCE TO RELATED APPLICATIONS

This application is a continuation-in-part of pending application Ser. No. 08/337,971 entitled "Cover Assembly and Method For Covering Undersink Piping" filed Nov. 14, 1994, which is a continuation-in-part of pending application Ser. No. 08/271,439 entitled "Cover Assembly and Method For Covering Undersink Piping" filed Jul. 7, 1994, which is a continuation-in-part of pending application Ser. No. 07/146,999 entitled "Cover Assembly and Method For Covering Undersink Piping" filed Oct. 29, 1993, which is now U.S. Pat. No. 5,341,830, which pending applications and issued patent are all completely incorporated herein by reference in their entireties.

FIELD OF THE INVENTION

This invention relates generally to undersink piping such as P-trap drains and water supply piping, and specifically discloses apparatuses and methods to cover an angle stop valve assembly so as to insulate the angle stop valve assembly piping and protect a person from abrasions and burns caused by contact with the piping

BACKGROUND OF THE INVENTION

Conventionally, hot and cold water are delivered to a sink faucet through hot and cold water lines including angle stop valve assemblies. Each angle stop valve assembly generally includes a supply pipe connected to the building plumbing which extends horizontally out of the wall and terminates in an angle stop valve. A supply line extends from the angle stop valve vertically upward to connect to the faucet or to faucet valve assemblies which regulate the flow of hot and cold water to the faucet. In most cases, the angle stop valve assemblies are located below the sink. A valve handle or removable valve key is used to open and close the angle stop valves to deliver the associated hot or cold water to the faucet.

Water from the faucet drains from the sink or basin, through a drain opening in the sink and empties into undersink piping. The undersink piping directs the water from the sink into the building's waste water system. The undersink drain piping is referred to as a "P-trap" drain, and "P-trap" drain assemblies along with angle stop value assemblies are most common sinks, both commercial and residential.

Current building regulations require that restroom facilities in a public building, such as restroom sinks, be accessible to all people, including disabled persons. Disabled persons, such as persons in wheelchairs, for example, must often maneuver the chair partially under the sink to access it. Since the angle stop valve assemblies and P-trap drain pipes protrude from the wall beneath the sink there is a risk of abrasions from the hard pipes or burns from the temperature of the pipes to the legs of the person confined to the wheelchair. Current federal and state regulations regarding undersink piping, most notably the Americans With Disabilities Act (ADA), require that the angle stop valve assemblies and P-trap piping of public facilities be covered and insulated so as to protect a person using the sink from being burned or from incurring injuries from impact with the piping. As a result of these regulations, various methods and apparatuses have been utilized to try and adequately cover and insulate undersink angle stop valve assemblies and P-traps. One of the earlier methods of insulation was to utilize loose foam insulation which was wrapped around the piping. However, wrapped foam insulation usually fit poorly and was difficult to secure resulting in wasted time and frustration by the plumber or other installer. Furthermore, the foam wrap, due to its poor fit and inadequate securing means, was not very aesthetically pleasing in its appearance. Additionally, the ribbed construction of a wrapped pipe leaves ridges and cavities which trap dirt and other bacteria under the sink.

Various other methods and apparatuses have been utilized to cover angle stop valve assemblies and P-trap piping beneath a sink as is evidenced by various patents in the field. However, besides often being ineffective, many of these other devices are still difficult and time consuming to secure and use, requiring various fasteners and other securing means to hold the insulation and coverings to the piping. Moreover, the devices may require various specially-sized pieces to fit the numerous sizes of fittings used in undersink applications. Specifically, angle stop valves are made in various lengths and sizes with the stem connection point where the supply line connects to the valve located at various positions along the valve length. The existing cover products for angle stop valves must be specially made to accommodate a particular valve length and stem placement, and therefore, numerous specialty pieces are necessary. This forces the installer to know exactly which piece is needed before installation. As may be appreciated, this is frustrating to the installer or plumber who has a certain dimensioned angle stop valve but a different dimensioned cover. Furthermore, it results in the installer having to carry numerous extra cover pieces of various sizes that may not be needed at a particular site.

Additionally, the angle stop valves are opened and closed with keys or handles of various shapes. Some existing insulation products leave the keys or handles exposed which is not aesthetically pleasing nor particularly suitable, as the uninsulated valve handles may become as hot as the respective valves. Other existing products cover the handles completely by encasing them with the angle stop valve. However, this makes them difficult to access and use.

Accordingly, there is a need for a simple and sanitary angle stop valve assembly cover and covering method which addresses the shortcomings of the existing devices and methods. It is therefore an objective of the present invention to provide such a cover and method which addresses the shortcomings of prior devices and is still effective to prevent a disabled person from being burned or bruised and cut by the angle stop valve and water supply piping underneath a sink.

SUMMARY OF THE INVENTION

The present invention addresses the objectives as discussed hereinabove by presenting an improved cover assembly for the water supply assembly located under a sink which is configured and adaptable to fit a large variety of differently sized angle stop valves. Therefore, various different pieces are not necessary for different water supply assemblies. The cover is relatively inexpensive and simple to manufacture and is simple to install in a very short time requiring little or no external fasteners. The cover is adequately secured to the piping when installed and is effective to prevent abrasions and burns, and is aesthetically pleasing in appearance with a smooth, outer surface having minimal cavities or openings that might trap dirt and other bacteria.

To that end, the insulative cover of the present invention is designed to cover an angle stop valve assembly including a supply pipe, an angle stop valve, a supply line and a handle or key utilized to open or close the angle stop valve. The cover includes a first elongated piece with a pipe portion configured to cover the supply pipe and a valve portion located proximate an end of the pipe portion which is configured to cover the angle stop valve. An oblong opening is formed within the valve portion and is oriented generally vertically. The supply line connects to the angle stop valve and extends through the oblong opening to the sink faucet.

A second elongated piece covers the supply line extending between the angle stop valve and faucet and therefore includes an elongated line portion. Attached at one end of the line portion is an oblong cover portion. The oblong cover portion is configured and shaped to cover the oblong opening of the first piece when the first and second pieces are positioned together on an assembled angle stop valve assembly. The line portion of the second piece is attached to the oblong cover portion proximate an end thereof such that when the oblong cover portion covers the oblong opening, the line portion of the second piece is located proximate one end of the oblong opening. The oblong cover portion and oblong opening are formed such that the second piece may be rotated 180° to place the line portion of the second piece proximate either end of the oblong opening. This allows one cover piece to accommodate various different angle stop valves having different lengths and dimensions. For example, short angle stop valves are covered by the first piece valve portion such that the stem on the angle stop valve which connects to the vertically extending supply line is located proximate a forward end of the oblong opening, i.e., the end closest to the front of the sink. Therefore, the supply line is located toward the forward end of the oblong opening. However, longer angle stop valves extend further rearwardly within the valve portion of the first cover piece, and the valve stem is located proximate the rearward end of the oblong opening more toward the rear of the sink. With the short valve, the second piece is oriented such that the line portion is at the forward end of the oblong opening and aligns with the stem and supply line. The oblong opening is covered by the oblong cover portion to insulate the entire angle stop valve assembly. However, in accordance with the principles of the present invention, the cover is adaptable to also fit the assembly using the longer angle stop valve. Rotation of the second piece approximately 180° orients the line portion to the rear end of the oblong opening so that it aligns with the valve stem and supply line. The oblong cover portion is symmetrical such that it will still completely cover the oblong opening when oriented with the line portion forward or rearward. Therefore, the present invention may be utilized with angle stop valves of different lengths without requiring numerous specially formed or dimensioned cover pieces. As a result, a single cover may be used interchangeably with long and short angle stop valves.

In one embodiment of the invention, the oblong cover portion of the second piece abuts with the oblong opening of the first piece to cover the opening. In an alternative embodiment, the second piece includes a vertically extending projection surrounding the oblong opening and the cover portion of the second piece has a collar which is configured to overlap the projection. In a further alternative embodiment, the cover portion is dimensioned to fit within the first piece vertical projection when covering the oblong opening.

An opening is formed in the end of the valve portion of the first piece opposite the pipe portion. A valve stem extends from the valve through the opening and is connected to a rotatable handle or key. In accordance with the principles of the present invention, a third cover piece is provided which covers the valve handle. The third piece has a generally circular body with extensions projecting from opposite radial positions on the circular body to define an oblong dimension in one diameter of the generally circular body. A lip extends inwardly on one side of the third piece so that the piece may be snapped over a valve handle and held thereon without any further securing mechanisms.

Handles and keys for angle stop valves generally have a circular or oblong shape. The third piece of the present invention is formed to be placed on either a round or oblong handle or key. Specifically, a circular handle will be held within the generally circular body of the third piece, while an oblong handle may be covered by aligning the handle with the radial extensions on the circular body such that the oblong diameter of the handle is aligned with the oblong shape of the valve handle. In that way, the third piece may be utilized with either handle shape eliminating the necessity of various different parts to adequately insulate various handle shapes.

In an alternative embodiment of the invention, the valve portion of the first piece is open at one end to allow access to the valve handle or key. The second elongated piece includes a movable closure which is coupled to one end of the oblong cover portion. The closure extends vertically downward from the second cover piece and is positioned such that it extends over the open end of the first piece valve portion to effectively close the open end of the valve portion when the first and second pieces are positioned together to insulate the angle stop valve and associated pipes. The closure is preferably hingedly connected to the second cover piece to provide access to the angle stop valve and handle. When the cover of the invention is in place, the entire angle stop valve assembly is effectively insulated, but the closure may be hinged open to access the valve handle and open or close the valve. When released, the closure returns to its rest position where it again provides insulation of the entire angle stop valve assembly.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
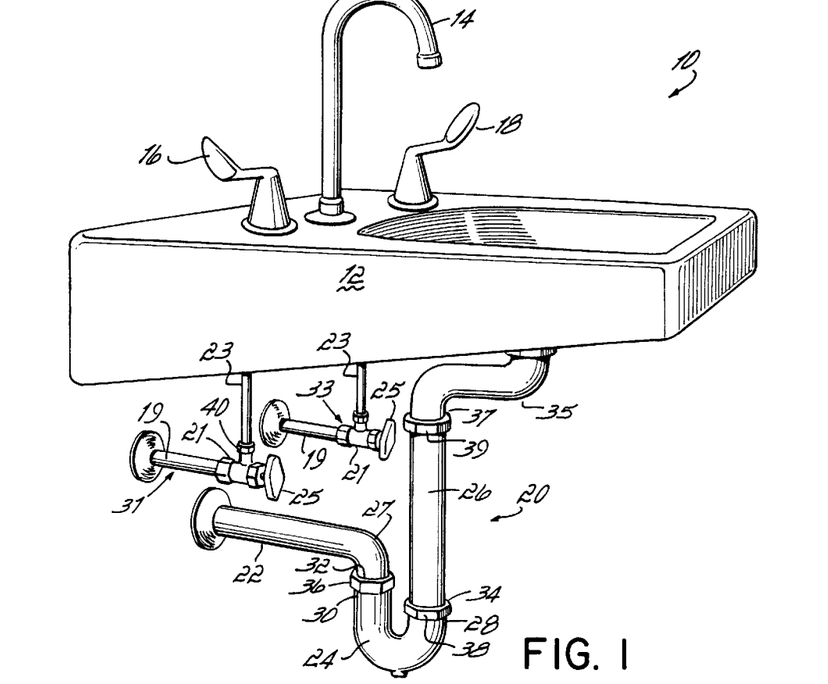
FIG. 1 is a front perspective view of a sink and undersink piping assembly on which the present invention is used.

FIG. 1 shows a conventional sink assembly 10 which might be utilized in public facilities and which, therefore, must comply with various federal, state and local ordinances regarding accessibility by disabled persons and covering of undersink piping, notably the Americans With Disabilities Act (ADA). Assembly 10 shows a sink basin 12, a faucet spout 14, and faucet valve handles 16 and 18 for directing hot and cold water, respectively, through faucet spout 14 and into basin 12. Beneath the sink are located various pipe assemblies for supplying water to the faucet 14 and draining water from the sink basin 12. Specifically, a traditional P-trap pipe assembly 20 is shown comprising an L-shaped pipe section 22, a 180° bend pipe or J-shaped pipe section 24 and a straight pipe section 26. The straight pipe section 26 extends downwardly from a sink basin drain opening (not shown) carrying waste water from the sink basin 12 to the J-shaped trap section 24. The straight section 26 connects with a vertical front portion 28 of the J-shaped trap section 24. Water flowing through the J-shaped section 24 travels up the vertical rear portion 30 of J-shaped section 24 and into L-shaped section 22 which is connected to the waste water system (not shown) within the internal plumbing of the building structure behind wall 29. The J-shaped trap section 24 traps solid objects which may have fallen down the drain opening. While the straight section 26 extends generally vertically, the transitional curve 27 of the L-shaped section 22 orients that section to extend generally horizontally with respect to a floor surface.

The conventional P-trap pipe assembly 20 in FIG. 1 is shown connected to an offset grid drain 35 which is often used with handicap accessible sinks. The offset grid drain 35 connects between the sink drain and the straight pipe section 26 of the P-trap. The offset grid drain 35 extends rearwardly from the front of basin 12 to effectively move the P-trap piping assembly 20 rearwardly away from the front of sink and preferably out of the way of a person in a wheelchair.

Hot and cold water is supplied to faucet 14 by way of the hot and cold water supply pipe and valve assemblies 31, 33 which are commonly referred to as angle stop valve assemblies and will be referred to as such herein.

The various drainage piping sections 22, 24, 26 and 35 are connected together at junctures 32, 34, and 37 utilizing fastening structures such as conventional pipe fastening nuts 36, 38, and 39. For example, nut 38 secured to straight section 26 might be screwed onto a threaded end of the J-shaped section 24 until sections 26 and 24 are held together at juncture 32 in a watertight seal. Alternatively other securing structures or methods might be used as will be recognized by a person of ordinary skill in the art. Sections 22 and 24 might be similarly fastened together using nut 36 over a threaded end on the rear portion 30 of J-shaped section 24 and sections 26 and 35 secured together in a like manner using nut 39. Alternatively, an offset grid drain 35 might not be used and the P-trap drain assembly would then be directly connected to the drain opening of basin 12. Greater detail and discussion of the undersink drain assembly and insulation thereof may be found in U.S. patent application Ser. No. 08/146,999 filed Oct. 29, 1993; now U.S. Pat. No. 5,341,830; and in pending U.S. patent application Ser. Nos. 08/271,439 filed Jul. 7, 1994; and 08/337,971 filed Nov. 14, 1994.

Angle stop valve assemblies 31, 33 must also be insulated in compliance with various Federal, State and local regulations. Both angle stop valves might abrade or bruise a person in a wheelchair, and the hot water angle stop valve and piping, in particular, may possibly scald a person if contacted. As shown in FIG. 1, typical angle stop valve assemblies 31, 33 include a supply pipe 19, an angle stop valve 21 connected to supply pipe 19, and a supply line 23 which connects to the angle stop valve 21 through a valve stem 40. Supply line 23 extends to a respective handle valve 16, 18 of the sink plumbing for the faucet spout 14. The supply lines 23, when valves 21 are open, deliver water to the faucet 14 as determined by faucet valves 16, 18. The valves 21, include valve handles 25 which are rotated to open and close valves 21 and deliver water to the supply line 23, and faucet 14. Although handle 25 of FIG. 1 is shown attached to valve 21, a removable key (not shown) might be utilized to open and close the valve, the angle stop valves have openings to receive such a key.

Figure 2:
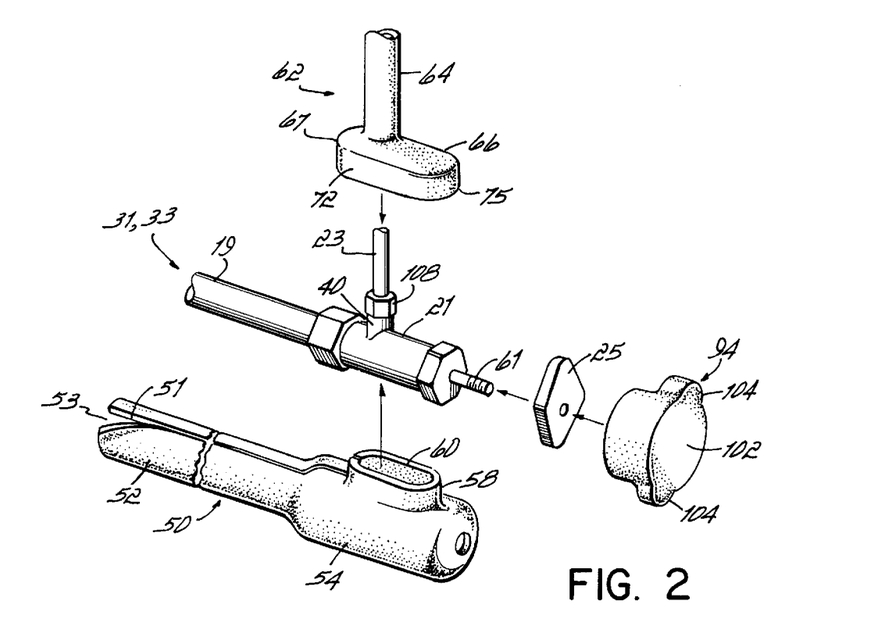
FIG. 2 is a disassembled exploded perspective view of an angle stop valve assembly and cover of the present invention.

The cover of the present invention is shown in FIG. 2 disassembled around an angle stop valve assembly 31, 33. Since angle stop valve assemblies for the hot and cold water valves are generally similar, the cover pieces for one valve will be described with the understanding that the cover pieces for the other angle stop valve are generally similar. Referring to FIG. 2, the angle stop valve cover of the present invention comprises an elongated first piece 50 including a pipe portion 52 and a valve portion 54 to cover the supply pipe 19 and angle stop valve 21 respectively. The pipe portion 52 and valve portion 54 of first piece 50 have a generally circular cross section to match the shapes of pipe 19 and valve 21, respectively, and are shown integrally connected in FIG. 2. However, it should be understood that those portions might be separated into separate cover pieces and coupled in some appropriate manner at the joint between the angle stop valve 21 and supply pipe 19. Angle stop valve 21 generally has a greater diameter than the supply pipe 19. Accordingly, the pipe portion 52 of cover piece 50 is preferably dimensioned with a smaller diameter than the diameter of valve portion 54 for a more snug fit. Pipe portion 52 includes a longitudinal bore 53 therein through which the supply pipe 19 extends. Valve portion 54 includes an inner space 55 which accommodates angle stop valve 21 (see FIG. 3). Bore 53 and space 54 are generally coaxial with each other.

An oblong opening 60 is formed in valve portion 54 and opens into space 55. In one embodiment of the first piece 50, a projection 58 extends generally vertically upward from valve portion 54 and is preferably integral with the valve portion 54. Projection 58 defines the oblong opening 60. In the embodiment shown in the Figures, the oblong opening 60 has an oval shape; however, it may be appreciated that the other oblong shapes, such as a rectangular shape, might be utilized. Oblong opening 60 defines a passageway to the angle stop valve 21 through which the supply line 23 extends to connect to the valve 21. Stem 40 extends upwardly from valve 21 through opening 60 to connect to line 23.

Figure 3:
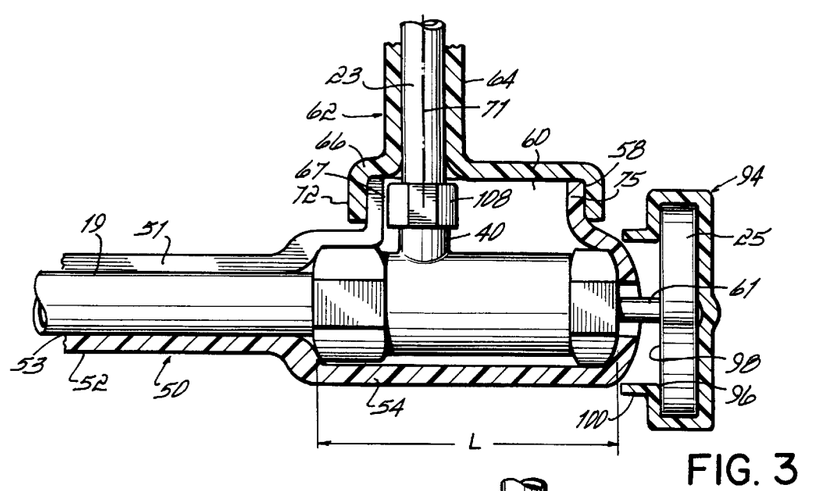
FIG. 3 is a cross-sectional view in partial elevation of the angle stop valve cover of FIG. 2.
Figure 4:
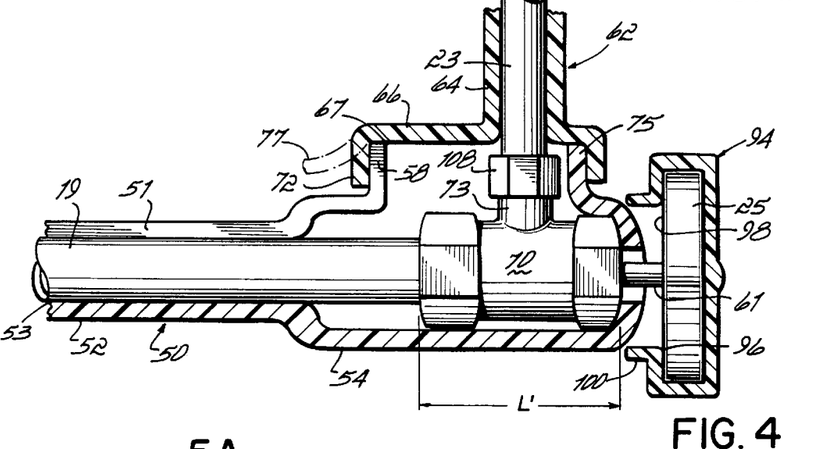
FIG. 4 is a cross-sectional view in partial elevation of the cover of FIG. 2 installed with a short angle stop valve.

A second cover piece 62 covers the supply line 23 and includes a line portion 64 and an oblong cover portion 66. When the first piece 50 and second piece 62 are positioned on the various pipe and valve sections, oblong cover portion 66 covers the oblong opening 60 of valve portion 54 as illustrated in FIGS. 3 and 4. Therefore, the oblong cover portion 66 of second piece 62 is preferably configured and dimensioned to completely cover opening 60 and thereby provide continuous coverage of each metal section of the angle stop valve assembly. In the embodiment illustrated in the Figures, the cover portion 66 has generally an oval shape to match the oval shape of opening 60. A handle stem 61 of valve 21 connects to a handle 25 to open and close valve 21 as discussed further hereinbelow. As seen in FIGS. 3 and 4, the line portion 64 will be positioned proximate one or the other ends of the oblong opening 60 when cover portion 66 covers the opening depending upon the length of the valve 21 and the position of the stem 40 and line 23. In that way, cover pieces 50 and 62 may be used with various different sizes of angle stop valves.

Referring now to FIG. 3, an angle stop valve assembly might utilize an angle stop valve 21 having a long length L. The stem 40 of the long angle stop valve 21 is located rearwardly away from the front of the sink 12 and toward the wall 29 (see FIG. 1). The location of stem 40 is also proximate a rearward end 67 of the oblong opening 60. The location of stem 40, in turn, determines the location of the supply line 23 which connects to stem 40. When utilizing a long angle stop valve as shown in FIG. 3, the second piece 62 of the invention is oriented with respect to first piece 50 such that the line portion 64 is located generally proximate the rearward end 67 of projection 58 and oblong opening 60. The line portion 64 is preferably connected integrally with cover portion 66 at one end of the cover portion, but may be in two separate pieces in which case an opening for stem 40 in cover portion 66 will need to be oriented close to end 67 of the oblong opening 60. In order to position the line portion 64 at either end of oblong opening 60, the second piece is rotated around axis 71 approximately 180°. By positioning the line portion 64 rearwardly as shown in FIG. 3, the line portion 64 covers supply line 19 and cover portion 66 covers oblong opening 60 to present a completely covered angle stop valve assembly.

However, the plumber or other installer who installs the angle stop valve assembly and under-sink piping may be required to use a shorter angle stop valve, or may only have such a shorter valve at his disposal. The present invention may be utilized with an angle stop valve assembly having a short angle stop valve as shown in FIG. 4. Angle stop valve 70 has a length of L' which is shorter than valve 21 and length L. The stem 73 of the shorter valve 70 is located proximate the forward end 75 of the projection 58 and oblong opening 60. Again, the location of stem 73 determines that the supply line 23 is also located proximate the forward end 75. To cover opening 60 and align the line portion 64 with the supply line 23, the second cover piece 62 is rotated 180° from the position of FIG. 3 to position the line portion 64 forwardly as shown in FIG. 4. The oblong opening 60 ensures that the cover of the present invention may be utilized with long and short angle stop valves having forward or rearward stem location. Moreover, the complementary oblong opening 60 and oblong cover portion 66 further ensure that when either length valve is used, the second piece 62 may be properly aligned so that the cover portion 66 completely covers oblong opening 60 and line portion 64 covers line 23 to provide insulative coverage over the entire angle stop valve assembly.

Figures 6, 7:
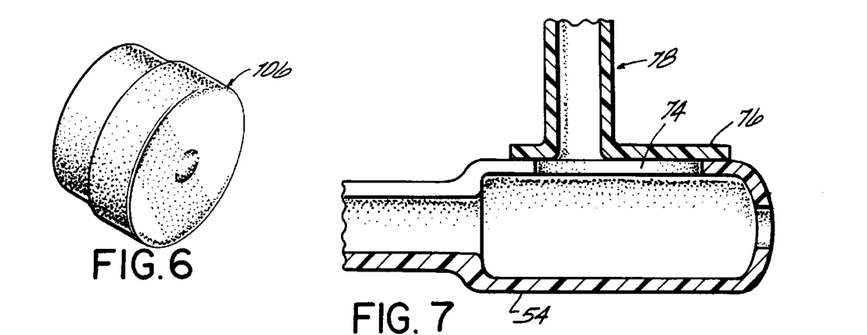
FIG. 6 is an alternative embodiment of a handle cover of the present invention.
FIG. 7 is an alternative embodiment of the cover of the present invention.

In a preferred embodiment of the invention as shown in FIGS. 2, 3 and 4, the cover portion 66 includes an annular collar 72 which extends therefrom around the periphery of the cover portion. The cover portion 66 and collar 72 are configured and dimensioned such that the cover portion at least partially overlaps projection 58 and completely covers oblong opening 60. In an alternative embodiment of the present invention, the cover portion may abut against the oblong opening 60 to seal the opening. For example, projection 58 might be eliminated from valve portion 54 such that there is only an oblong opening in the valve portion 54. As shown in FIG. 7, oblong opening 74 is covered by cover portion 76 of cover piece 78. The collar 72 might also be eliminated such as is shown on cover portion 76. In the embodiment of FIG. 7, the cover portion 76 and oblong opening 74 simply abut to seal the opening. Alternatively, cover portion 76 might include a collar (not shown) which abuts against and covers oblong opening 74.

Figures 8, 9:
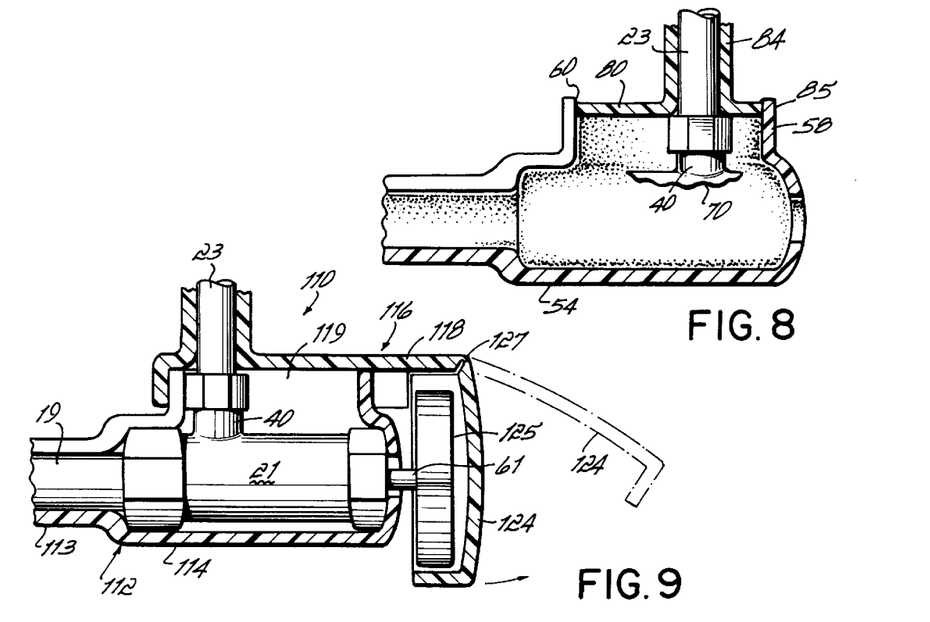
FIG. 8 is another alternative embodiment of the cover of the present invention.
FIG. 9 is another alternative embodiment of the present invention wherein the second cover piece includes a hinged closer depending therefrom.

In another alternative version as shown in FIG. 8, the projection 58 and cover portion 84 might be dimensioned such that cover portion 80 fits within projection 58 to seal the oblong opening 60. In such an embodiment, the cover portion 80 may or may not include a collar extending therearound. FIG. 8 illustrates cover portion 80 without a collar. Still further, cover portion 80 may be dimensioned to abut against the top rim 85 of projection 58, without fitting into the projection.

Thereby, the single cover of the present invention may be utilized with various different angle stop valve assemblies using angle stop valves of different lengths without requiring special pieces to accommodate and adapt to the angle stop valve length. This results in a substantial savings of time for an installer or plumber, should they only have one or the other length of valve, and thus eliminates the necessity of having to buy and carry in stock various different cover pieces to accommodate different valve lengths. Still another embodiment of the present invention might utilize a collar 77 (in phantom) which is flexible with respect to the cover portion 66. (See FIG. 4.) Collar 77 may be folded upwardly during installation and then folded downwardly to cover projection 58.

Figure 5:
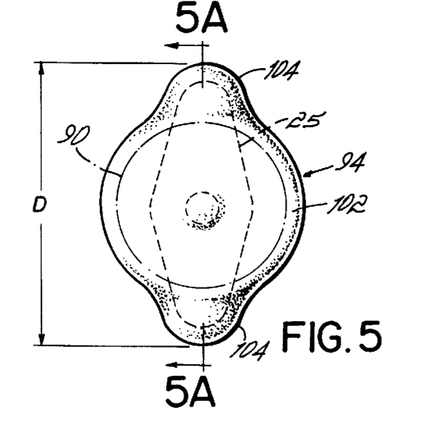
FIG. 5 is a front view of a valve handle cover in accordance with the principles of the present invention.
Figure 5A:
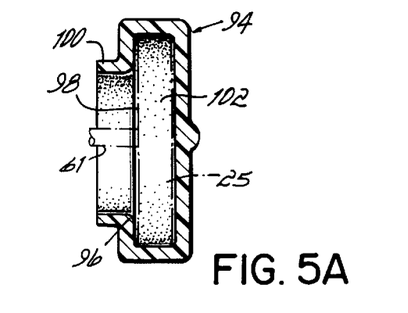
FIG. 5A is a cross-sectional side view of the handle cover of FIG. 5 along lines 5A—5A.

The present invention also provides an insulative cover for the handle utilized to open and close the angle stop valve. Specifically, referring to FIG. 2, a handle 25 is shown which is attached to a valve stem 61, by a screw or other suitable fastener. A cover 94 extends over handle 61 and insulates the handle to protect against burns and abrasions. As shown in FIG. 5A, cover 94 includes an annular lip 96 which is configured to partially overlap a back surface 98 of the handle 25. Lip 96 allows cover 94 to be snapped onto handle 25 and held thereto without any further fastening structures (see FIGS. 3 and 4). Cover 94 can then be readily removed by pulling the cover 94 up around and away from handle 25. In a preferred embodiment of the invention, cover 94 further includes an annular collar 100 which projects from annular lip 96. Collar 100 extends toward valve portion 54 and prevents a person from contacting the stem 61 which connects handle 25 to angle stop valve 21 (see FIG. 3).

The handles utilized for opening and closing angle stop valves are predominantly either circular in shape or diamond shaped like handle 25. In accordance with the principles of the present invention, cover 94 has a generally circular body 102 such that it will fit a circular valve handle 90 illustrated in phantom in FIG. 5. However, to also fit an diamond-shaped handle 25 also shown in dashed lines in FIG. 5, circular body 102 includes arcuate extensions 104 projecting from opposite radial positions on the circular body 102 to define an oblong dimension D on the circular body 102. To place cover 94 over a diamond-shaped handle 25, the oblong dimension D is aligned with the oblong dimension of handle 25 as shown in FIG. 5. Once secured onto handle 25, the cover 94 does not require any further fastening structures. FIG. 6 illustrates a cover 106 for a circular handle in accordance with the principles of the invention.

Referring again to FIG. 2, the first cover piece 50 has a longitudinal slit 51 from one end, along pipe portion 52 and part of valve portion 54, and up to and including one side of the projection 58. Longitudinal slit 51 allows piece 50 to be split or spread apart along most of its length to be installed over supply line 19 and valve 21. As further shown in FIG. 2, the stem 40 of valve 21 is connected to a supply line 23, such as by using a pipe nut 108. The projection 58 on cover portion 54 extends over valve stem 40 when first piece 50 is placed over line 19 and valve 21.

The second elongated cover piece 62 is placed over supply line 23 when the angle stop valves are installed. The second cover piece 62 is preferably unslit and slides up and over line 23. After the cover piece 50 has been placed over line 19 and valve 21, then cover 62 is placed over line 23, and line 23 is attached to valve 21. The downwardly extending collar 72 of cover portion 66 of FIGS. 2–4 prevents dirt and bacteria from settling in the collar and being trapped thereunder. Collar 72 also serves to hold the cover piece 50 together onto pipe 19 and valve 21 by holding the projection 58 together over a portion of the slit 51. To further secure cover piece 50, one or more external fastening wraps (not shown) might be utilized over slit 51 to hold cover piece 50 together along the slit. The length of each of the pipe portion and the line portion are preferably dimensioned to be equal to or longer than lengths of the respective supply lines and supply pipes covered by the pieces. When installing the cover of the present invention, the installer may then sever the ends of the portions opposite the angle stop valve to provide a custom fit over the piping.

Figure 10:
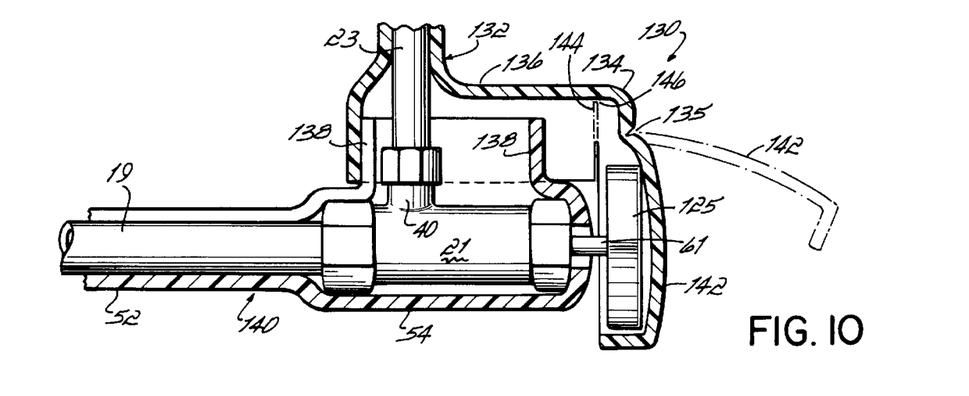
FIG. 10 is still another alternative embodiment of the present invention with an alternative second piece closure structure.

FIGS. 9 and 10 disclose alternative embodiments of the cover of the present invention and specifically disclose alternative second pieces which eliminate the necessity of a separate handle cover. Cover 110 includes an elongated first piece 112 similar to first piece 50 described hereinabove. Piece 112 includes a pipe portion 113 and a valve portion 114 to insulate the supply pipe 19 and angle stop valve 21 respectively. An elongated second piece 116 has an oblong cover portion 118 which covers the oblong opening 119 formed by valve portion 114. The second piece 116 includes a movable closure 124 which is coupled to an outward end of the oblong cover portion 118 to extend vertically downward from the cover portion. The closure 124 is positioned and configured such that it extends over the end of the valve portion 114 to cover valve handle 125. Closure 124 effectively covers the handle 125 when the first and second pieces are positioned together to completely insulate the angle stop valve 21. As illustrated in phantom in FIG. 9, closure 124 is preferably attached to the second piece cover portion 118 to be movable away from handle 125 to allow access to the handle 125 for opening and closing the valve. In a preferred embodiment, the material at the joint 127 between oblong cover portion 118 and closure 124 is sufficiently elastic to allow closure 124 to swing away from handle 125. Alternatively, the joint 127 might include a thin section of insulation material which hingedly attaches closure 124 to cover portion 118.

FIG. 10 shows another alternative embodiment of the second cover piece of the invention. Cover 130 includes a second piece 132 having a full collar structure 134 surrounding the cover portion 136 which cooperates with extension 138 on the first cover piece 140 to cover the angle stop valve and its associated lines. Closure 142 is hingedly attached to the collar structure 134 at a joint 135 to be moved away from handle 125 as shown in phantom in FIG. 10. The elasticity of the joint 135 causes the closure to return to the closed position to cover handle 125 when it is released. Joint 135 may be thinner than the material forming the various cover pieces to allow adequate hinging of the closure. Also closure 142 could have a slit 144 (shown in phantom) to create a hinge 146.

Therefore, the present invention may be easily and quickly installed so that, when fully assembled, it provides an aesthetically pleasing cover for an angle stop valve assembly which completely covers and insulates the undersink water supply piping. The present invention may be manufactured utilizing Vinyl Plastisol from Plastomeric of New Baltimore, Ohio which provides adequate insulation and cushioning to prevent burns or abrasions from contact with the pipes but allows flexing of the material for installation and removal. Other materials might also be utilized without deviating from the scope of the invention.

The cover may be utilized with valve assemblies utilizing either long or short angle stop valves. The insulative cover embodiments of the present invention have minimal, exposed cavities for trapping dirt or other bacteria. Further, the insulative covers of the present invention are simple to install, requiring very few tools, very little time and few or no external fasteners.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An insulative cover for an undersink angle stop valve assembly comprising:

a first elongated piece having a pipe portion configured to cover a supply pipe and a valve portion at an end of the pipe portion and configured to cover an angle stop valve, the valve portion having an oblong opening with opposite ends to facilitate connection of a supply line to the angle stop valve;

a second piece having a line portion configured to cover the supply line and an oblong cover portion, the line portion coupled to the cover portion and positioned off center with respect to the oblong cover portion and proximate one end of the cover portion, the oblong cover portion configured to cover the oblong opening when the first and second pieces are positioned together on the valve assembly and further configured such that the line portion may be selectively positioned proximate either one of the opposite ends of the oblong opening when the oblong opening is covered by the cover portion;

whereby the cover may be utilized to insulate angle stop valve assemblies having angle stop valves of various lengths.

2. The insulative cover of claim 1 wherein the second piece comprises a closure depending downwardly from the cover portion, the closure configured to cover a valve handle connected to the angle stop valve when the first and second pieces are positioned together.

3. The insulative cover of claim 2 wherein the closure section is coupled to said second piece to be movable between a first position to expose the valve handle and a second position to cover the handle.

4. The insulative cover of claim 3 further comprising a flexible joint connecting the closure with the second piece cover portion for hinged movement of the closure.

5. An insulative cover for an undersink angle stop valve assembly comprising:

a first elongated piece having a pipe portion configured to cover a supply pipe and a valve portion at an end of the pipe portion and configured to cover an angle stop valve, the valve portion having an opening therein to facilitate connection of a supply line to the angle stop valve through the opening;

a second piece having a line portion configured to cover the supply line and a cover portion, the line portion coupled to the cover portion proximate one end of the cover portion, the cover portion configured to cover the valve portion opening when the first and second pieces are positioned together on the valve assembly;

a closure depending downwardly from the second piece cover portion and configured to cover a valve handle connected to the angle stop valve when the first and second pieces are positioned together to cover the angle stop valve assembly.

6. The angle stop valve of claim 5 wherein the closure is movable between a first position covering the handle and a second position spaced away from the handle for accessing the handle to open and close the angle stop valve.

7. The angle stop valve of claim 5 further comprising a flexible joint connecting the closure with the second piece cover portion for hinged movement of the closure between the first and second positions.

* * * * *